(12) United States Patent
Liu (10) Patent No.: US 11,030,346 B2
(45) Date of Patent: Jun. 8, 2021

(54) INTEGRATED CIRCUIT AND DATA PROCESSING METHOD FOR ENHANCING SECURITY OF THE INTEGRATED CIRCUIT

(71) Applicant: eMemory Technology Inc., Hsin-Chu (TW)

(72) Inventor: Hsin-Chou Liu, Hsinchu County (TW)

(73) Assignee: eMemory Technology Inc., Hsin-Chu (TW)

( * ) Notice: Subject to any disclaimer, the term of this patent is extended or adjusted under 35 U.S.C. 154(b) by 265 days.

(21) Appl. No.: 16/424,446

(22) Filed: May 28, 2019

(65) Prior Publication Data
US 2020/0021437 A1 Jan. 16, 2020

Related U.S. Application Data

(60) Provisional application No. 62/697,411, filed on Jul. 13, 2018, provisional application No. 62/768,099, filed on Nov. 16, 2018.

(51) Int. Cl.
| | |
|---|---|
| *H04L 9/08* | (2006.01) |
| *G06F 21/71* | (2013.01) |
| *H04L 29/06* | (2006.01) |
| *H04L 9/32* | (2006.01) |

(52) U.S. Cl.
CPC ............ *G06F 21/71* (2013.01); *H04L 9/0869* (2013.01); *H04L 9/32* (2013.01); *H04L 63/06* (2013.01)

(58) Field of Classification Search
None
See application file for complete search history.

(56) References Cited

U.S. PATENT DOCUMENTS

| | | | |
|---|---|---|---|
| 5,987,438 A | * | 11/1999 | Nakano ................ G06K 7/0013 235/375 |
| 6,947,323 B2 | | 9/2005 | Naso |
| 9,569,601 B2 | | 2/2017 | Sadhasivan |
| 9,813,395 B2 | | 11/2017 | Sadhasivan |
| 9,825,766 B2 | | 11/2017 | Sadhasivan |
| 9,887,844 B2 | | 2/2018 | Gehrer |
| 9,900,310 B2 | | 2/2018 | Brickell |
| 9,906,507 B2 | | 2/2018 | Sadhasivan |
| 10,032,016 B2 | | 7/2018 | Sadhasivan |

(Continued)

FOREIGN PATENT DOCUMENTS

| | | |
|---|---|---|
| CN | 1564981 A | 1/2005 |
| TW | 200833056 | 8/2008 |
| TW | 201329781 A1 | 7/2013 |

*Primary Examiner* — Benjamin E Lanier
(74) *Attorney, Agent, or Firm* — Winston Hsu (57) ABSTRACT

An integrated circuit includes a core circuit and a function lock circuit. The core circuit includes at least one function block circuit. The function lock circuit is coupled to the core circuit. The function lock circuit includes a random number source, an entanglement circuit, and a memory. The random number source is configured to generate a random code. The entanglement circuit is coupled to the random number source and the core circuit and configured to generate an unlocking code according to the random code and a command signal. The memory is coupled to the entanglement circuit and configured to store the unlocking code. The at least one function block circuit of the core circuit is determined to be locked/unlocked according to a presence of the unlocking code.

18 Claims, 9 Drawing Sheets

(56) References Cited

U.S. PATENT DOCUMENTS

| | | | |
|---|---|---|---|
| 10,129,037 B2 | 11/2018 | Sadhasivan | |
| 2004/0236919 A1 | 11/2004 | Okaue | |
| 2008/0244734 A1* | 10/2008 | Okaue | G06F 21/72 |
| | | | 726/19 |
| 2013/0060689 A1* | 3/2013 | Oskolkov | G06Q 20/10 |
| | | | 705/42 |
| 2015/0270952 A1* | 9/2015 | Sethumadhavan | H04L 9/008 |
| | | | 713/182 |
| 2016/0103625 A1* | 4/2016 | Fujimoto | G06F 13/16 |
| | | | 711/103 |
| 2018/0018673 A1 | 1/2018 | Muchsel | |
| 2018/0123808 A1* | 5/2018 | Hung | H04L 9/0866 |
| 2018/0191696 A1 | 7/2018 | Sadhasivan | |
| 2018/0307827 A1 | 10/2018 | Sadhasivan | |
| 2019/0334702 A1* | 10/2019 | Heisrath | G06F 21/123 |

* cited by examiner

INTEGRATED CIRCUIT AND DATA PROCESSING METHOD FOR ENHANCING SECURITY OF THE INTEGRATED CIRCUIT

CROSS REFERENCE TO RELATED APPLICATIONS

This application claims the benefit of U.S. provisional application No. 62/697,411, filed Jul. 13, 2018 and U.S. provisional application No. 62/768,099 filed Nov. 16, 2018.

BACKGROUND OF THE INVENTION

1. Field of the Invention

The present invention discloses a data processing method, and more particularly, a data processing method for enhancing security in order to avoid counterfeiting of an integrated circuit.

2. Description of the Prior Art

With advancement of technologies, an integrated circuit (IC) design is one of topics competing with different manufacturers. Generally, the IC design involves creations of electronic components, such as transistors, resistors, capacitors and interconnects of these components onto a piece of semiconductor.

For IC designers, a purpose of IC design is to manufacture an IC with a micro-volume, power efficient, and high performance. Since the IC design is popular in recent years, some illegal crackers want to counterfeit all functions of the IC by using a reverse process for generate a cloned IC.

IC clone is an illegal technology widely used by microcontrol unit (MCU) illegal crackers. It is used by a large variety of IC attackers from individuals, who want cheaper electronic gadgets, to large companies interested in increasing their sales without large investment in design. Therefore, IC suppliers suffer from huge losses due to IC clone markets every year. Unfortunately, a conventional IC lacks an anti-clone function. Therefore, when hardware of the conventional IC is completely counterfeited by the illegal crackers, all IC functionalities can be performed correctly. In other words, when the illegal crackers have high technologies for counterfeiting IC, functionalities of the cloned IC and a "genuine" IC are identical. Therefore, to develop an IC capable of performing the anti-clone function is an important issue.

SUMMARY OF THE INVENTION

In an embodiment of the present invention, a function locking/unlocking method of an integrated circuit (IC) is disclosed. The function locking/unlocking method comprises providing a random code from a random number source of the IC, the IC entering a locking condition according to the random code and initial data retrieved from a memory, enabling the IC by a command signal and generating an unlocking code according to the random code, and the IC entering an unlocking condition according to the random code and the unlocking code.

In another embodiment of the present invention, an integrated circuit with enhanced security is disclosed. The integrated circuit comprises a core circuit and a function lock circuit. The core circuit comprises at least one function block circuit. The function lock circuit is coupled to the core circuit. The function lock circuit comprises a random number source, an entanglement circuit, and a memory. The random number source is configured to generate a random code. The entanglement circuit is coupled to the random number source and the core circuit and configured to generate an unlocking code according to the random code and a command signal. The memory is coupled to the entanglement circuit and configured to store the unlocking code. The at least one function block circuit of the core circuit is determined to be locked/unlocked according to a presence of the unlocking code.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
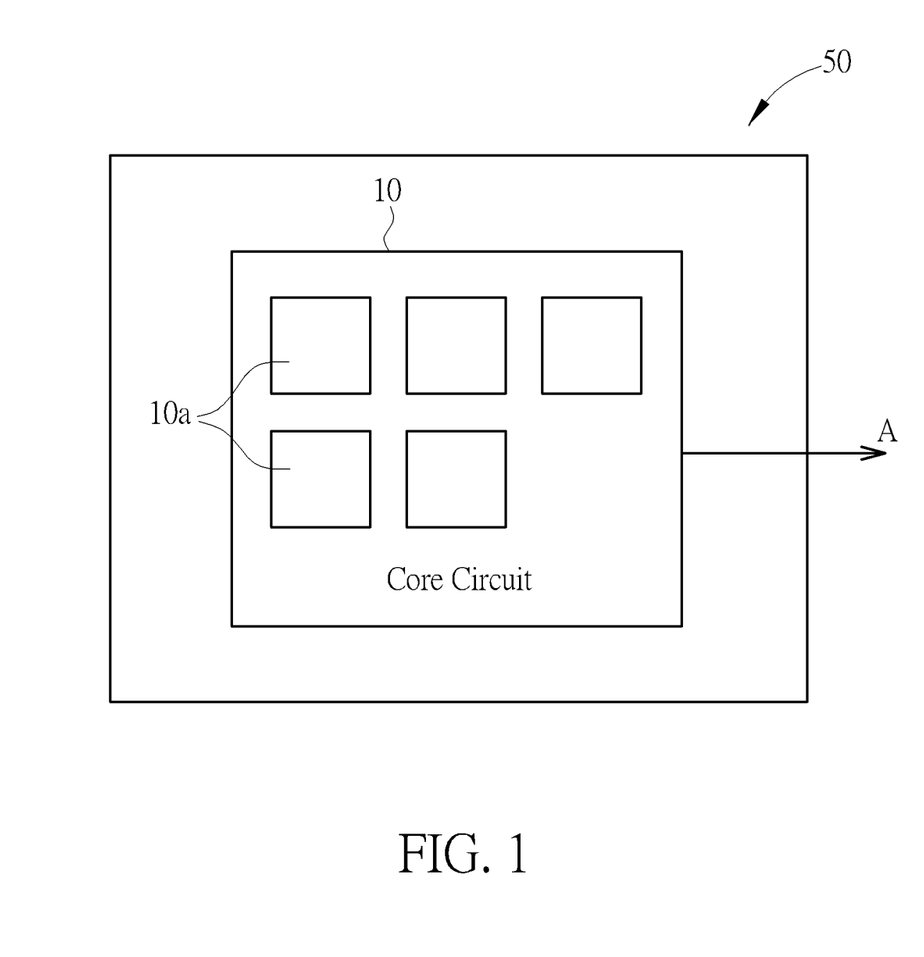
FIG. 1 is a block diagram of a conventional integrated circuit.

FIG. 1 is a block diagram of a conventional integrated circuit (IC) 50. The conventional IC 50 includes a core circuit 10 which comprises at least one function block circuit 10a for outputting data of all functionalities of the conventional IC 50 accordingly, such as N function blocks. N is a positive integer. In FIG. 1, the outputted data A can correspond to all functionalities of the conventional IC 50. However, once the conventional IC 50 is cloned, the cloned IC will output data of all functionalities as the original IC 50. Thus, manufacturers of the conventional IC 50 without anti-clone function will suffer from pirate of IC.

Figure 2:
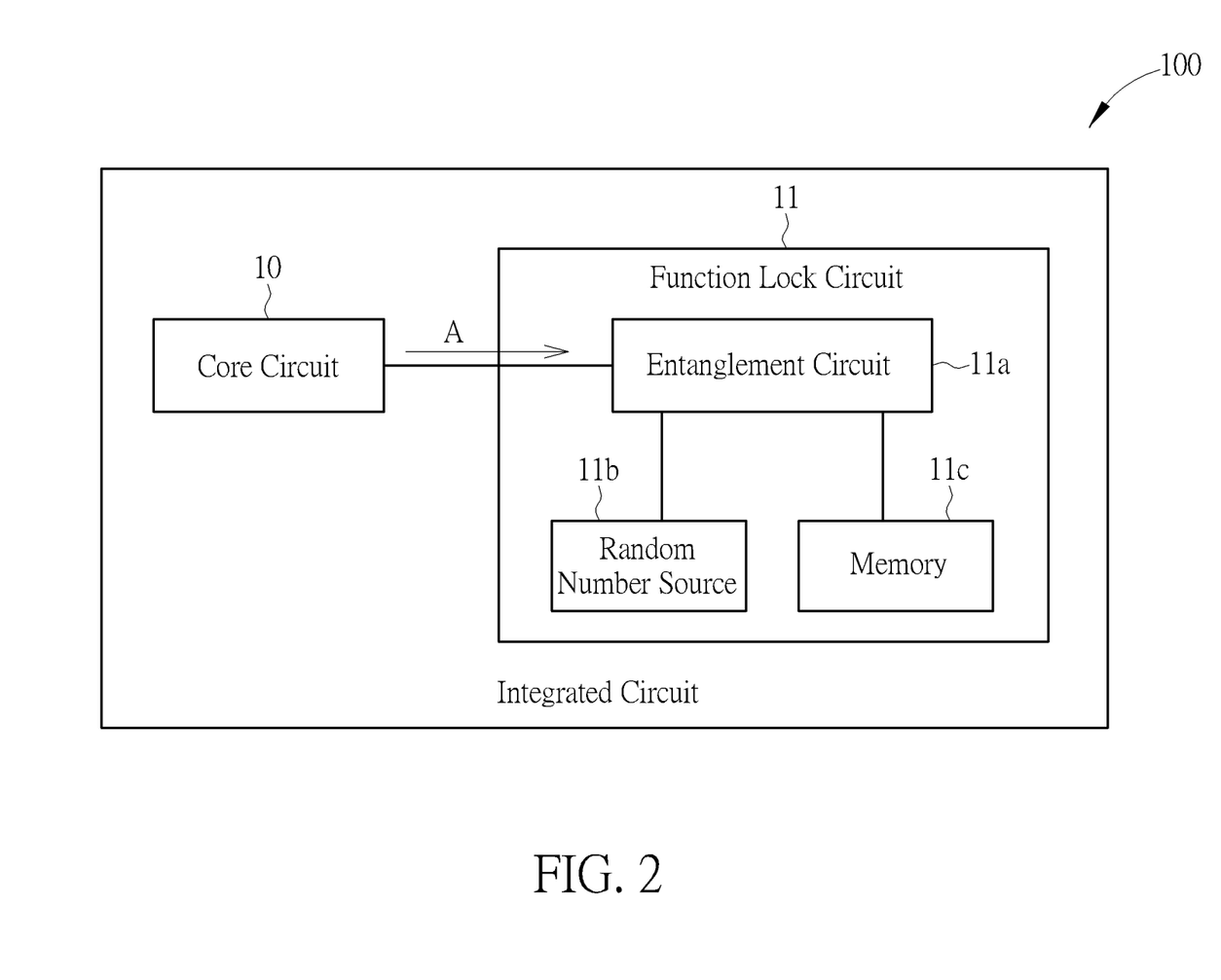
FIG. 2 is a block diagram of an integrated circuit according to an embodiment of the present invention.

FIG. 2 is a block diagram of an integrated circuit (IC) 100 with enhanced security according to an embodiment of the present invention. The IC 100 includes a core circuit 10 and a function lock circuit 11. The core circuit 10 comprising at least N function block circuit 10a is used for transferring first data A (i.e. data of all functionalities of the core circuit 10). For example, the core circuit 10 can transfer power control data, voltage control data, artificial intelligence (AI) based neural network output data, and/or any type of designed function data of the IC 100. The function lock circuit 11 is coupled to the core circuit 10 for processing the first data A. Here, the function lock circuit 11 can be regarded as a security circuit capable of performing an anti-clone function. In other words, when the function lock circuit 11 is introduced to the IC 100, even if the IC 100 is cloned, the function of the counterfeit IC will not work correctly.

The function lock circuit 11 includes an entanglement circuit 11a, a random number source 11b, and a memory 11c. The random number source 11b is used for providing a random code. Here, the random number source 11b can be, but not limited to, an anti-fuse random number source for providing the random code. However, any random code generator or pseudo random code generator can be applied to the IC 100. The entanglement circuit 11a comprising a mess-up algorithm is coupled to the random number source 11b and the core circuit 10 for locking and unlocking the first data A (i.e. the functionality of the core circuit 10). Here, the first data A can be locked by scrambling its bit allocations, adjusting a part of or all outputted signal voltages, or generating a data sequence or an unidentified data sequence. Therefore, illegal crackers cannot directly extract useful information since the first data A is locked. The memory 11c is coupled to the entanglement circuit 11a for storing an unlocking code. The memory 11c can be a non-volatile memory (NVM).

The IC 100 with the function lock circuit 11 will be defaulted in a locking condition. Only when the IC is enabled with a command signal, the IC 100 then enters an unlocking condition. Details of performing a locking function and an unlocking function of the IC 100 are also illustrated later.

Figure 3:
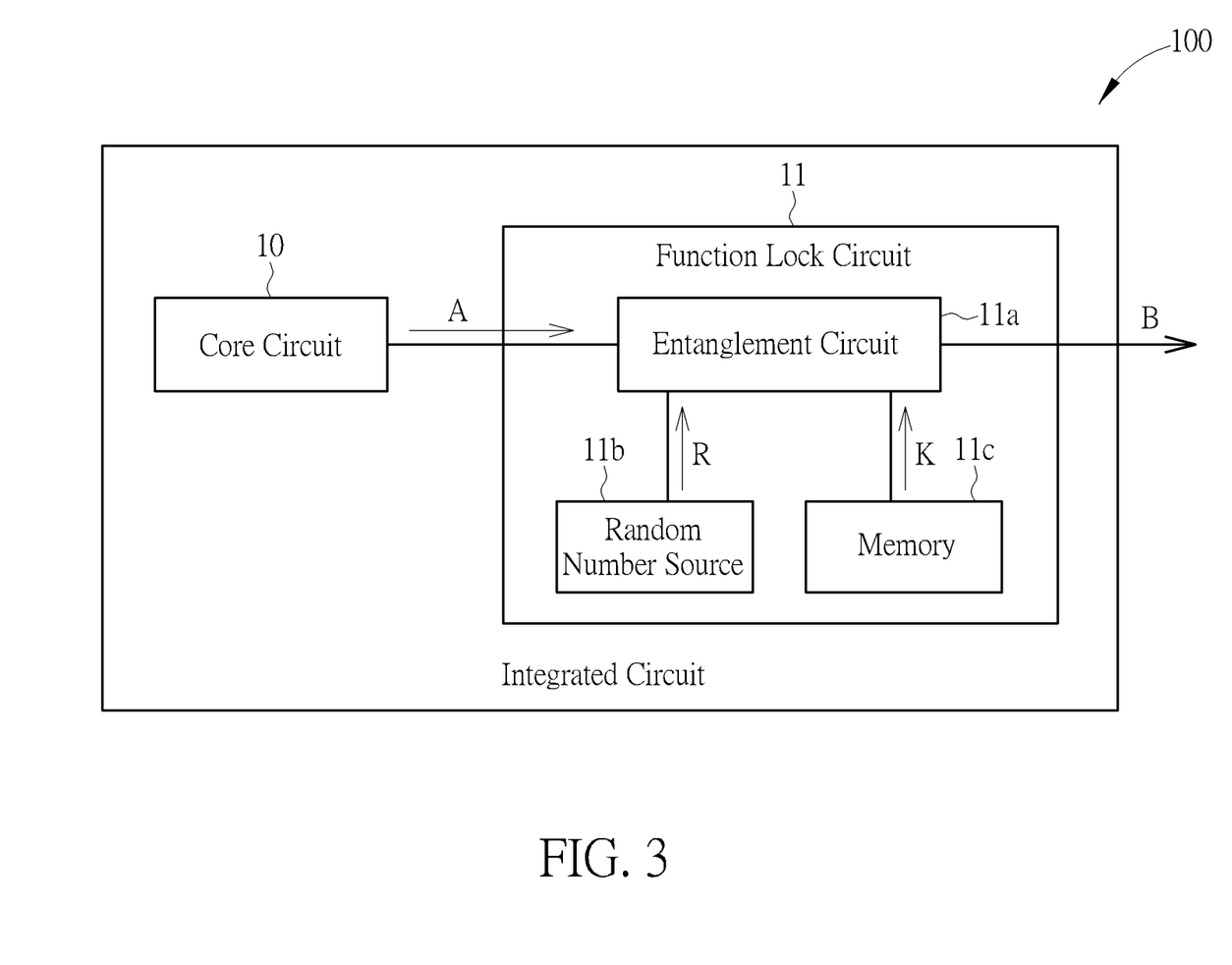
FIG. 3 is an illustration of performing a locking function of the integrated circuit in FIG. 2.

FIG. 3 is an illustration of performing a locking function of the IC 100 to make sure that the IC 100 is in a locking condition. In the IC 100, the core circuit 10 can transfer the first data A. The first data A can be regarded as data of original functionalities of the IC 100. The random number source 11b can provide a random number pool. The random code R can be selected from the random number pool and can be transferred to the entanglement circuit 11a. The memory 11c can transfer an initial data K to the entanglement circuit 11a. After the first data A is received by the entanglement circuit 11a, the entanglement circuit 11a can lock the first data A by using a locking function to generate the second data B. For example, the entanglement circuit 11a can use a locking function $f_{LOCK}(\ )$ to generate the second data B in form of $f_{LOCK}(A,R,K)$. In other words, when the initial data K is predetermined or fixed, the first data A can be converted to the second data B by the entanglement circuit 11a according to the random code R and the initial data K. For example, exclusive-or operators can be introduced to the locking function. The second data B can be written by $$B = f_{LOCK}(A, R, K)$$
$$= K \oplus (A \oplus R)$$

The first data A, the second data B, and the initial data K can be three data vectors. A symbol $\oplus$ is denoted as a bit-wised exclusive-or operator. Since the second data B is generated by messing up the first data A with the random code R and the initial data K, the second data B is different from the first data A and cannot be directly identified. In other words, the second data B can be regarded as locked data of modified functionalities (or say, wrong data of the original functionalities) of the IC 100. Therefore, when illegal crackers drive the IC 100, they can only acquire "wrong" data outputted from the IC 100 since the IC 100 is in the locking condition (i.e. the data of the original functionalities of the IC 100 is messed up). Therefore, since the IC 100 in FIG. 3 is capable of performing the locking function, even when the IC 100 is cloned, the functionality of the counterfeit IC will not work correctly.

It is to be noted that the IC 100 is defaulted in a locking condition. The IC 100 is unlocked unless an enabling procedure is processed. Further, it is assumed that if there are a plurality of ICs 100, each IC 100 has its individual random number source. This also implies that each IC 100 has its unique random number R selected from its individual random number source 11b. The wrong second data B outputted from each IC 100 in the locking condition will also be totally different which results in difficulty of cloning.

Figure 4:
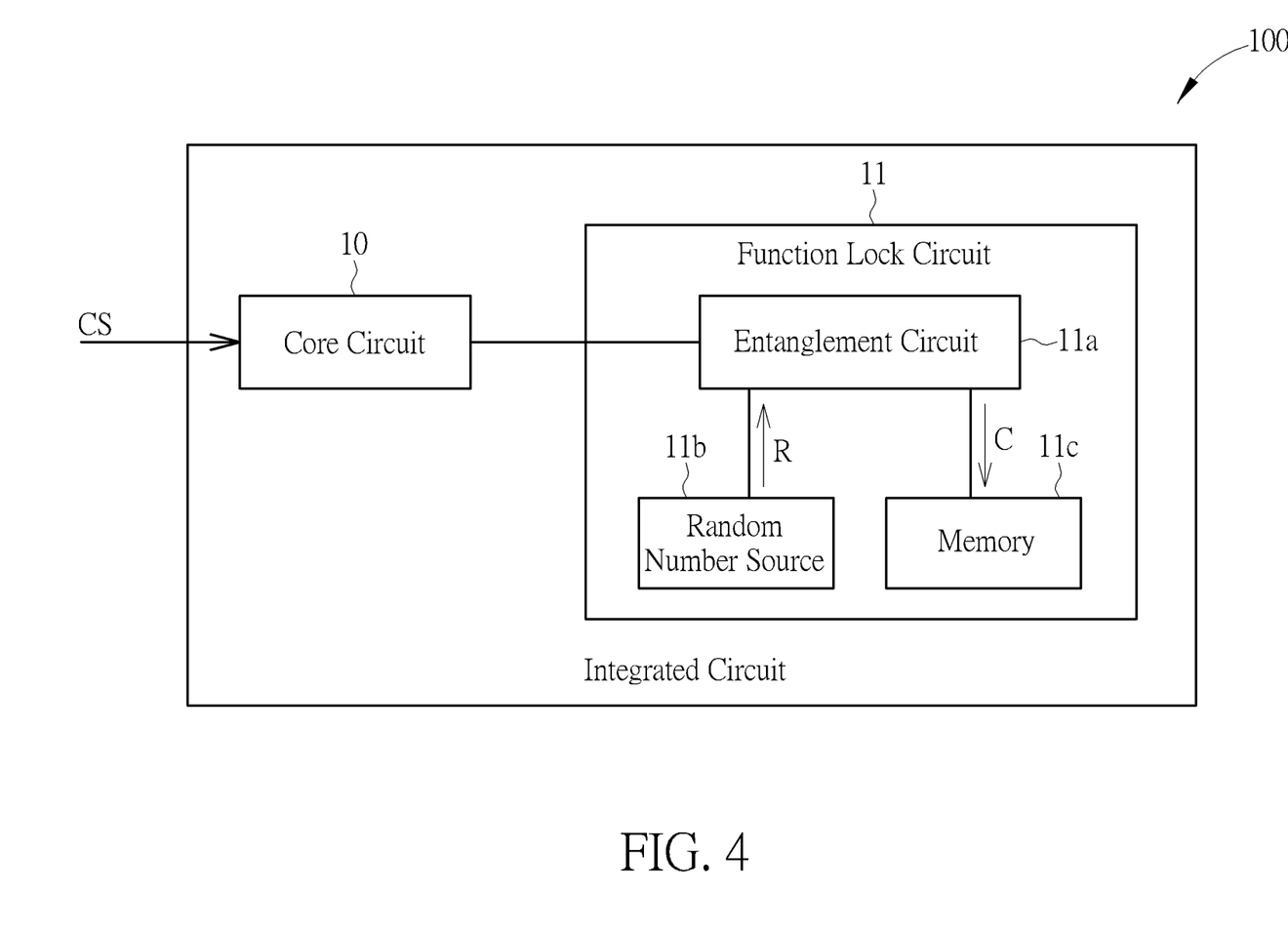
FIG. 4 is an illustration of generating an unlocking code of the integrated circuit in FIG. 2.

FIG. 4 is an illustration of an enabling procedure and generating an unlocking code C of the IC 100. For IC manufacturers, in order to unlock a part of or all functionalities of the IC 100, a command signal CS is essential for enabling the IC 100 to output "unlocked" data. When the command signal CS is received by the IC 100, the entanglement circuit 11a can be triggered to generate the unlocking code C. The unlocking code C can be generated according to the random code R.

In the IC 100, when no unlocking code C is introduced, the first data A is messed up to generate the second data B (wrong data) according to the random code R and the initial data K as shown in FIG. 3. Since the second data B cannot be identified, the IC 100 enters the locking condition. After the command signal CS is used for generating the unlocking code C, the unlocking code C can be used for controlling the IC 100 to enter the unlocking condition. The unlocking code C can be stored to the memory 11c. Therefore, when the command signal CS is absent, even if the IC 100 is cloned, the function of the counterfeit IC will not work correctly.

Figure 5:
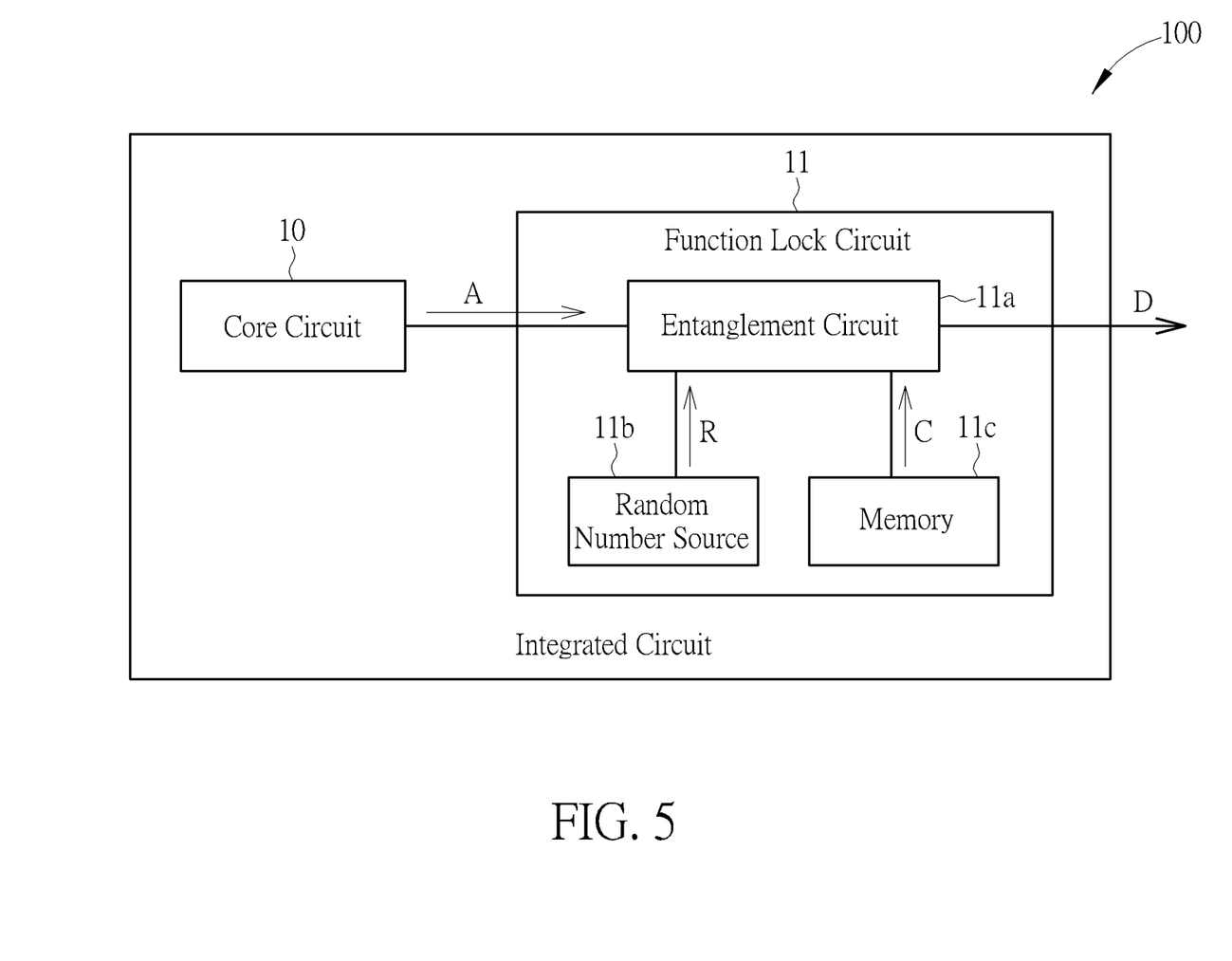
FIG. 5 is an illustration of performing an unlocking function of the integrated circuit in FIG. 2.

FIG. 5 is an illustration of performing an unlocking function of the IC 100 to make sure that the IC 100 enters the unlocking condition. After enabling the IC 100, the unlocking code C generated by the entanglement circuit 11a is stored in the memory 11c. Then, the unlocking code C can be transferred from the memory 11c to the entanglement circuit 11a. Then, the entanglement circuit 11a can generate the third data D by using the unlocking function according to the first data A, the random code R, and the unlocking code C. The first data A can be regarded as data of original functionalities of the original IC 100. The entanglement circuit 11a can use an unlocking function $f_{UNLOCK}(\ )$ to generate the third data D in form of $f_{UNLOCK}(A,R,C)$. For example, the exclusive-or operators can be introduced to the unlocking function. The third data D can be written by $$D = f_{UNLOCK}(A, R, C)$$
$$= C \oplus (A \oplus R)$$

Here, since the unlocking code C generated from the entanglement circuit is equal to the random code R (i.e., C=R), the third data D can be derived by $$D = C \oplus (A \oplus R)$$
$$= R \oplus (A \oplus R)$$
$$= A$$

In other words, when the unlocking function is successfully performed by generating an appropriate unlocking code C, the third data D can be converted to the first data A.

In the IC 100, any reasonable hardware or technology modification falls into the scope of the present invention. For example, the locking function $f_{LOCK}( )$ and the unlocking function $f_{UNLOCK}( )$ can be two linear or non-linear functions. Further, the third data D can be regarded as an unlocked data of at least one part of functionalities of the IC 100. For example, the IC 100 is designed to perform N functionalities. However, by using the locking function $f_{LOCK}( )$, the N functionalities of the IC 100 can be locked. After the unlocking code C is introduced to perform the unlocking function $f_{UNLOCK}( )$, M functionalities of the N functionalities of the IC 100 can be unlocked. M and N are two positive integers and M≤N. Since the third data D can be converted to the first data A by using the unlocking code C generated by the entanglement circuit 11a triggered by the command signal CS, the unlocking code C can be regarded as a key for unlocking functionalities of the IC 100. It is assumed that there are a plurality of ICs 100, each IC 100 has its individual random number source. This implies that each IC 100 has it unique random number R selected from its individual random number source. In other words, each IC 100 has its own individual key (unlocking code C) since the key for unlocking IC 100 is generated from the random number R. This also increases the difficulty of cloning.

Figure 6:
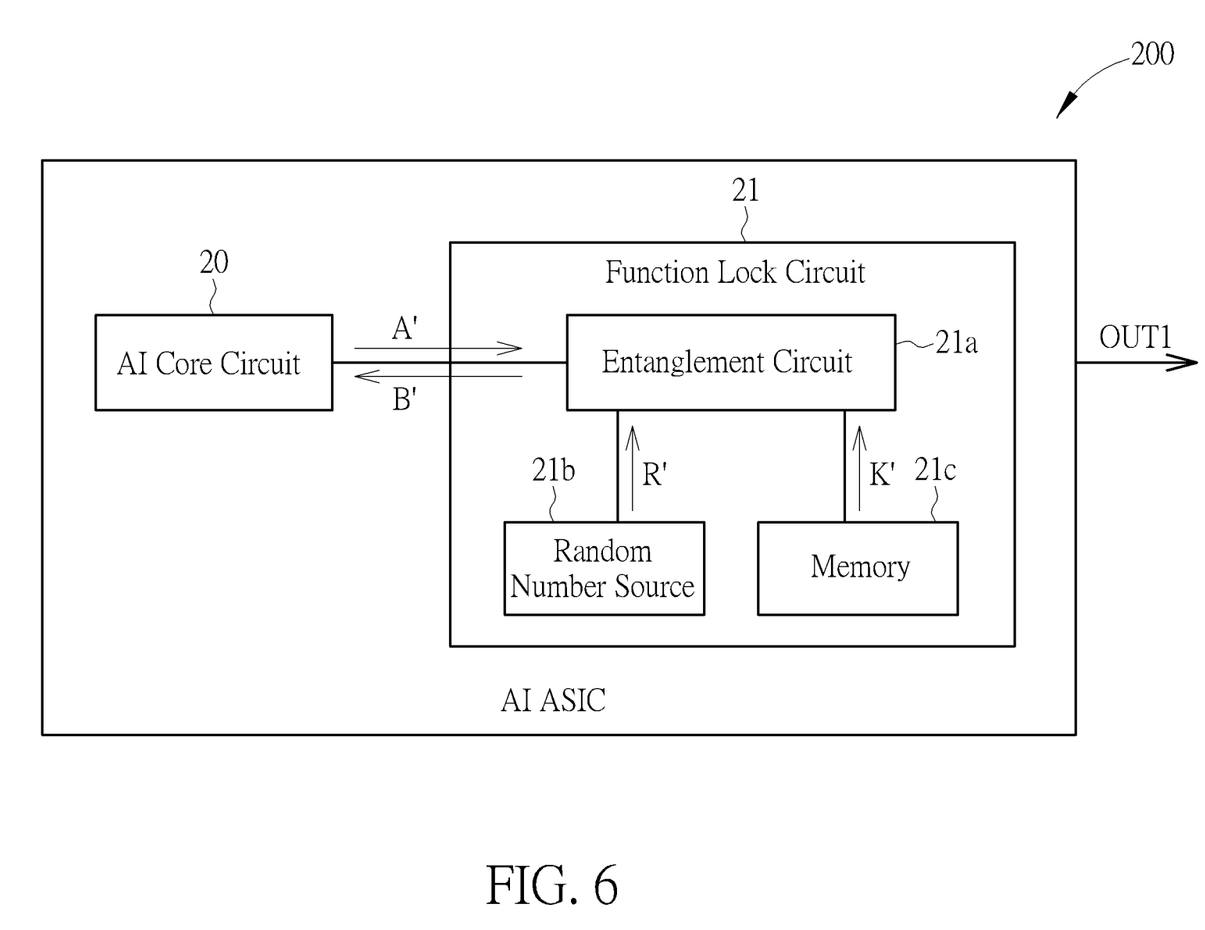
FIG. 6 is an illustration of performing a locking function of the integrated circuit in FIG. 2 when the integrated circuit is an artificial intelligence application-specific integrated circuit.

FIG. 6 is an illustration of performing a locking function of the IC 100 when the IC 100 is an artificial intelligence (AI) application-specific integrated circuit (ASIC). For avoiding ambiguity, the IC 100 designed as the AI ASIC is called as an IC 200 hereafter. The IC 200 includes an AI core circuit 20 and a function lock circuit 21 coupled to the AI core circuit 20. However, hardware allocations of the IC 200 are similar to hardware allocations of the IC 100. Thus, their illustrations are omitted here.

In the IC 200, an AI core circuit 20 can transfer the first data A'. The first data A' can be regarded as data of original functionalities of the AI ASIC. For example, the first data A' can include weighting data or an artificial neural network of the AI ASIC. The random number source 21b can provide a random number pool. The random code R' can be selected from the random number pool and can be transferred to the entanglement circuit 21a. The memory 21c can transfer initial data K' to the entanglement circuit 21a. After the first data A' is received by the entanglement circuit 21a, the entanglement circuit 21a can lock the first data A' by using a locking function to generate the second data B'. The entanglement circuit 21a can use a locking function $f_{AI-LOCK}( )$ to generate the second data B' in form of $f_{AI-LOCK}(A',R',K')$. In other words, when the initial data K' is predetermined or fixed, the first data A' can be converted to the second data B' by the entanglement circuit 21a according to the random code R' and the initial data K'. For example, multiplication operators can be introduced to the locking function. The second data B' can be written by $$B' = f_{AI-LOCK}(A', R', K')$$
$$= A' \times R' \times K'$$

The first data A', the second data B', and the initial data K' can be three data vectors. The multiplication operators can be bit-wised multiplication operators. Since the second data B' is generated by messing up the first data A' with the random code R' and the initial data K', the second data B' is different from the first data A' and cannot be directly identified. In other words, in the IC 200, the first data A' and the second data B' represent different AI inference results since the second data B' includes wrong weighting data of the AI ASIC (i.e., since scales of the first data A' are changed) That is to say, since the wrong weighting data is received by the AI core circuit 20, the AI ASIC 200 generates false inference result OUT1. Therefore, when illegal crackers drive the IC 200, they can only acquire "false" inference result OUT1 of the IC 200 since the data of the original functionalities of the IC 200 is messed up. Therefore, since the IC 200 in FIG. 6 is capable of performing the locking function, even the IC 200 is cloned, the cloned IC will malfunction.

Figure 7:
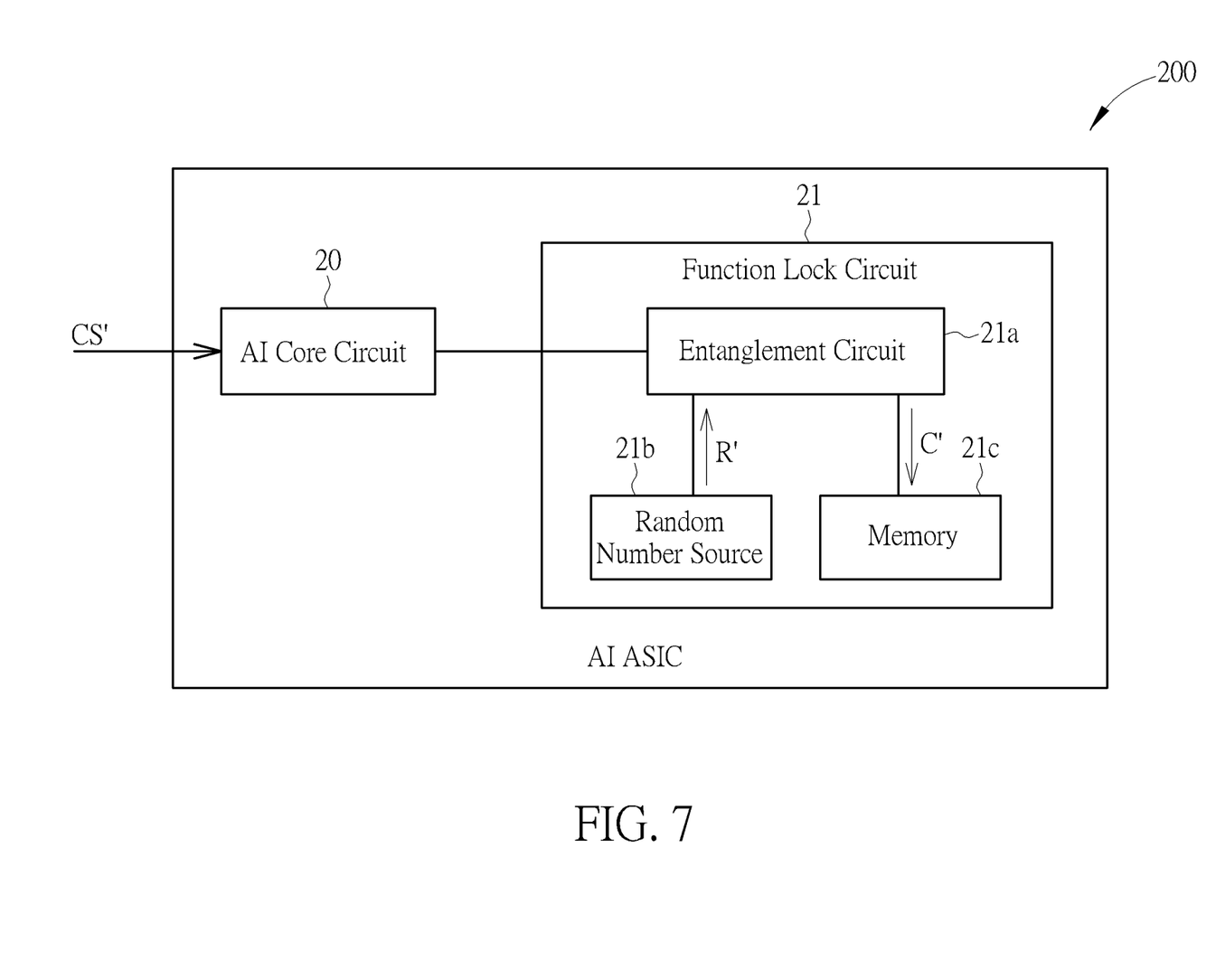
FIG. 7 is an illustration of generating an unlocking code of the integrated circuit in FIG. 2 when the integrated circuit is an artificial intelligence application-specific integrated circuit.
Figure 8:
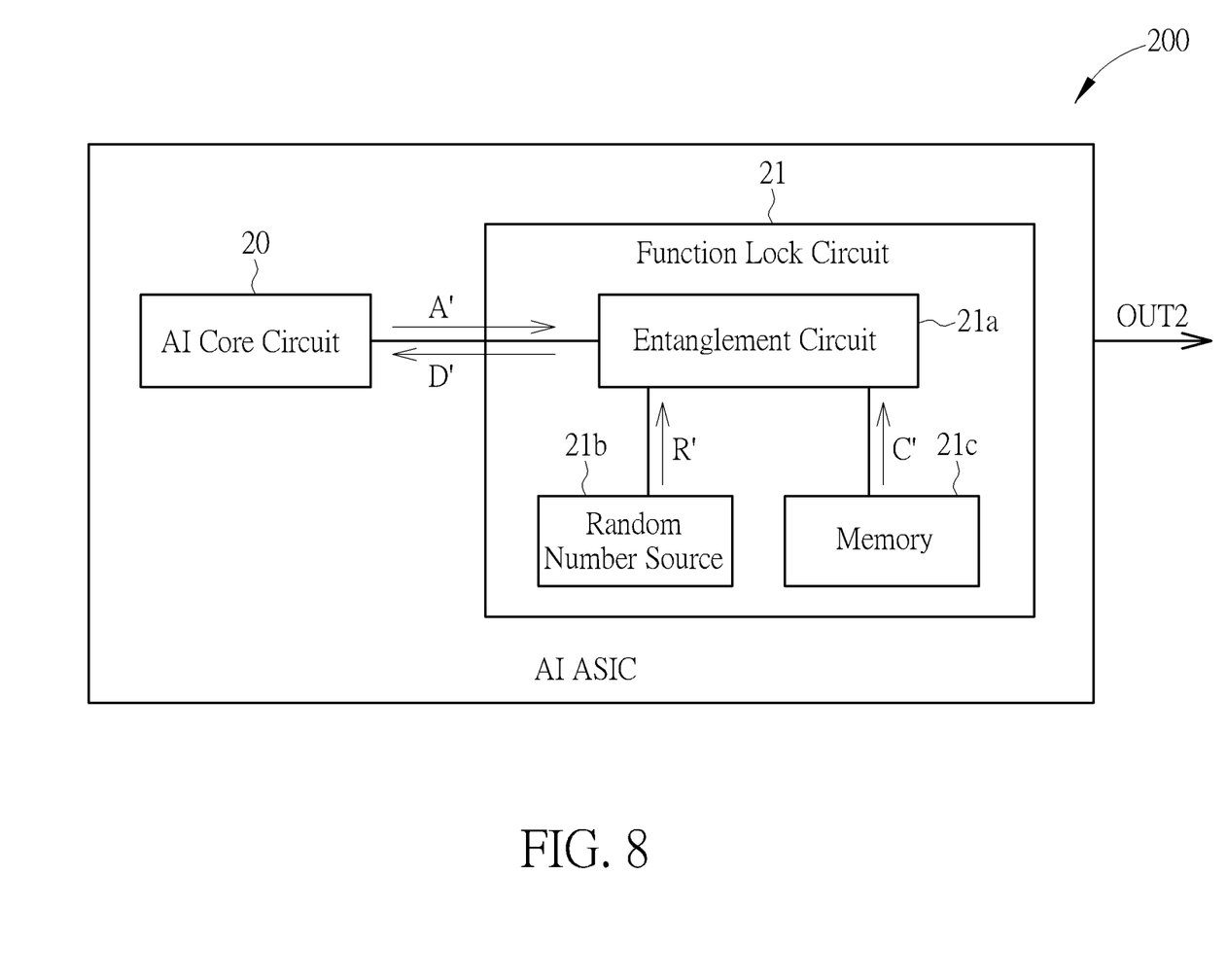
FIG. 8 is an illustration of performing an unlocking function of the integrated circuit in FIG. 1 when the integrated circuit is an artificial intelligence application-specific integrated circuit.

FIG. 7 is an illustration of generating an unlocking code R' of the IC 200. For IC manufacturers, in order to unlock a part of or all functionalities of IC 200, a command signal CS' is essential for enabling the IC 200 to output "unlocked" data. Here, the command signal CS' is unique for the IC 200. When the command signal CS' is received by the IC 200, the entanglement circuit 21a can be triggered to generate the unlocking code C'. The unlocking code C' can be generated according to the random code R'. In the IC 200, when no unlocking code C' is introduced, the first data A' is messed up to generate the second data B' according to the random code R'. Since the second data B' cannot be identified, the IC 200 enters a locking condition and generates the false inference result OUT1. After the command signal CS' is used for generating the unlocking code C', the unlocking code C' can be used for controlling the IC 200 to enter an unlocking condition. Then, the IC 200 can generate correct inference result OUT2 (as shown in FIG. 8). The unlocking code C can be stored to the memory 21c. Therefore, when the command signal CS' is absent, even when the IC 200 is cloned, the cloned IC will malfunction.

FIG. 8 is an illustration of performing an unlocking function of the IC 200. After the unlocking code C' generated by the entanglement circuit 21a is stored in the memory 21c, the unlocking code C' can be transferred from the memory 21c to the entanglement circuit 21a. Then, the entanglement circuit 21a can generate third data D' by using the unlocking function according to the first data A', the random code R', and the unlocking code C'. The entanglement circuit 21a can use an unlocking function $f_{AI-UNLOCK}( )$ to generate the third data D' in form of $f_{AI-UNLOCK}(A', R',C')$. For example, the multiplication operators can be introduced to the unlocking function. The third data D' can be written by $$D' = f_{AI-UNLOCK}(A', R', C')$$
$$= A' \times R' \times C'$$

Here, by generating the unlocking code C' equal to a reciprocal of the random code R' (i.e., C'=1/R'), the third data D' can be derived by $$D' = A', R', C'$$
$$= A' \times R' \times (1/R')$$
$$= A'$$

In other words, when the unlocking function is successfully performed by generating an appropriate unlocking code C', the third data D' can be converted to the first data A'. Therefore, the AI ASIC can generate the correct inference result OUT2.

In the IC 200, any reasonable hardware or technology modification falls into the scope of the present invention. For example, the locking function $f_{AI\text{-}LOCK}()$ and the unlocking function $f_{AI\text{-}UNLOCK}()$ can be two linear or non-linear functions. Further, the third data D' can be regarded as unlocked data of at least one part of functionalities of the IC 200. For example, the IC 200 is designed to perform N' functionalities. However, by using the locking function $f_{AI\text{-}LOCK}()$, the N' functionalities of the IC 200 can be locked. After the unlocking code C' is introduced to perform the unlocking function $f_{AI\text{-}UNLOCK}()$, M' functionalities of the N' functionalities of the IC 200 can be unlocked. M' and N' are two positive integers and M'≤N'. Since the third data D' can be converted to the first data A' by using the unlocking code C' generated by the entanglement circuit 21a triggered by the command signal CS', the unlocking code C' can be regarded as a key for unlocking functionalities of the IC 200.

Figure 9:
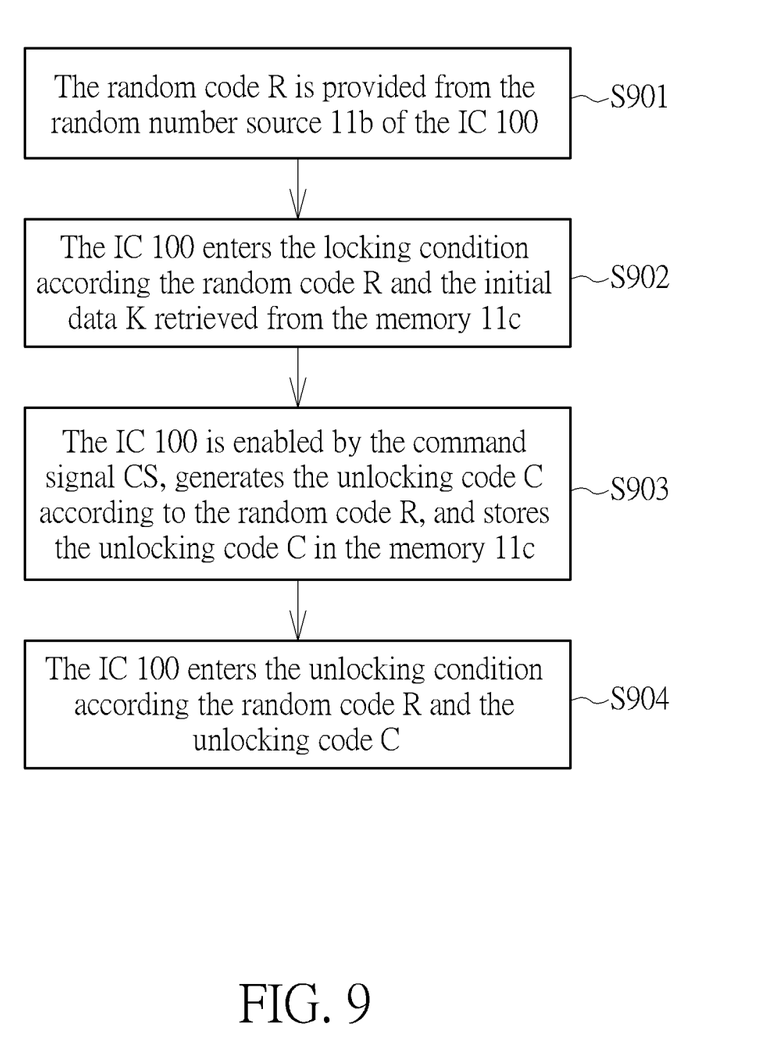
FIG. 9 is a flow chart of a function locking/unlocking method performed by the integrated circuit in FIG. 2.

FIG. 9 is a flow chart of a function locking/unlocking method performed by the IC 100. The function locking/unlocking method includes step S901 to step S904. Any hardware or technology modification falls into the scope of the present invention. Step S901 to step S904 are illustrated below.

step S901: the random code R is provided from the random number source 11b of the IC 100;

step S902: the IC 100 enters the locking condition according the random code R and the initial data K retrieved from the memory 11c;

step S903: the IC 100 is enabled by the command signal CS, generates the unlocking code C according to the random code R, and stores the unlocking code C in the memory 11c;

step S904: the IC 100 enters the unlocking condition according the random code R and the unlocking code C;

Each individual IC 100 comprises a function lock circuit 11 including an entanglement circuit 11a, a random number source 11b and a memory 11c.

In step S901, the random number source 11b provides the random code R to the entanglement 11a for subsequent steps. In step S902, since the IC 100 is not enabled yet, the entanglement circuit 11a messes up the original data A (or say, the first data A) according to the random code R and the initial data K transferred from the memory 11c. Then, the wrong second data B is outputted. At this time, the IC 100 is in the locking condition.

In step S903, the IC 100 is enabled by the command signal CS. The entanglement circuit 11a is triggered to generate the unlocking code C according to the random number R and store the unlocking code C to the memory 11c. In step S904, the entanglement circuit 11a outputs the third data D according to the random code R and the unlocking code C. Since the unlocking code C can be regarded as a key for unlocking functionalities of the IC 100, the third data D is the same as the original first data A. In other words, the IC 100 enters the unlocking condition in this step.

In the IC 100, when no unlocking code C is introduced, the second data B cannot be identified. Therefore, the IC 100 enters the locking condition and even if it is cloned, the IC 100 will malfunction. After the command signal CS is used for generating the unlocking code C, the unlocking code C can be used for controlling the IC 100 to enter the unlocking condition. Therefore, the IC 100 can be available for use.

It is to be noted that the core circuit 10 of the IC 100 comprises at least one function block circuit, such as N function block circuits. All the N function block circuits of the core circuit 10 can be unlocked according to the unlocking code C which is generated during an enabling operation. However, it can be designed properly to only unlock a part of N function block circuits when the IC 100 enters the unlocking condition according to another unlocking code C' which is generated during another enabling operation. That is to say, the IC 100 can be enabled several times and can be designed to have different unlocking condition according to different unlocking codes.

To sum up, the present invention discloses an IC with function lock circuit and a function locking/unlocking method of the IC. The IC can lock its output data of functionalities by using an entanglement circuit. Specifically, when no unlocking code is introduced, output data of the IC cannot be identified. Therefore, even if the IC is cloned, the IC will malfunction. In other words, the IC is capable of performing an anti-clone function and is hard to be counterfeited by illegal crackers. Further, a data owner or an authorized person can use a command signal for enabling the entanglement circuit to generate a desired unlocking code. The unlocking code can be regarded as a key for unlocking functionalities of the IC. By using the unlocking code, the IC can generate correct output data or output desired functionality. Further, the unlocking code is unique for the IC so that the illegal crackers cannot use a "common" key or a "master" key for identifying output data of the IC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A function locking/unlocking method of an integrated circuit (IC) comprising:
   providing a random code from a random number source of the IC; the IC entering a locking condition according to the random code and initial data retrieved from a memory;
   enabling the IC by a command signal and generating an unlocking code according to the random code;
   and the IC entering an unlocking condition according to the random code and the unlocking code;
   wherein when the IC entering the locking condition, first data corresponding to original functionalities of the IC is messed up by an entanglement circuit according to the random code and the initial data, and second data corresponding to locked data of modified functionalities of the IC is outputted.

2. The method of claim 1, further comprising:
   storing the unlocking code to the memory of the IC; and transferring the unlocking code from the memory to the entanglement circuit of the IC.

3. The method of claim 1, wherein when the IC enters the unlocking condition, the entanglement circuit outputs third data corresponding to unlocked data of at least one part of functionalities of the IC according to the random code and the unlocking code.

4. The method of claim 3, wherein the second data is generated in form of $f_{LOCK}$(A,R,K), A is the first data, R is the random code, K is the initial data, and $f_{LOCK}$( ) is the locking function.

5. The method of claim 3, wherein the third data is generated in form of $f_{UNLOCK}$(A,R,C), A is the first data, R is the random code, C is the unlocking code, and $f_{UNLOCK}$( ) is the unlocking function.

6. The method of claim 3, wherein the third data is converted to the first data when the IC is in the unlocking condition.

7. The method of claim 3, wherein the integrated circuit is an artificial intelligence (AI) application-specific integrated circuit (ASIC), and the third data comprises weighting data of the AI ASIC.

8. An integrated circuit with enhanced security comprising:
   a core circuit comprising at least one function block circuit;
   and a function lock circuit coupled to the core circuit, the function lock circuit comprising:
   a random number source configured to generate a random code;
   an entanglement circuit coupled to the random number source and the core circuit and configured to generate an unlocking code according to the random code and a command signal;
   and a memory coupled to the entanglement circuit and configured to store the unlocking code;
   wherein the at least one function block circuit of the core circuit is determined to be locked/unlocked according to a presence of the unlocking code;
   wherein when the integrated circuit is in a locking condition, first data transferred from the core circuit to the function lock circuit is messed up by the entanglement circuit according to the random code, and second data corresponding to locked data of modified functionalities of the integrated circuit is outputted.

9. The integrated circuit with enhanced security of claim 8, wherein the integrated circuit is defaulted in a locking condition.

10. The integrated circuit with enhanced security of claim 8, wherein the integrated circuit enters an unlocking condition when the command signal is received by the integrated circuit.

11. The integrated circuit with enhanced security of claim 8, wherein when the integrated circuit enters an unlocking condition according to the random code and the unlocking code.

12. The integrated circuit with enhanced security of claim 8, wherein the random number source is an anti-fuse random number source.

13. The integrated circuit with enhanced security of claim 8, wherein the unlocking code stored in the memory is transferred to the entanglement circuit.

14. The integrated circuit with enhanced security of claim 8, wherein the integrated circuit is an artificial intelligence (AI) application-specific integrated circuit (ASIC).

15. The integrated circuit with enhanced security of claim 8, wherein the first data transferred from the core circuit to the function lock circuit corresponding to data of original functionalities of the integrated circuit, when the integrated circuit is locked, the second data outputted from the integrated circuit corresponding to locked data of modified functionalities of the integrated circuit, and when the integrated circuit is unlocked, third data outputted from the integrated circuit corresponding to unlocked data of at least one part of functionalities of the integrated circuit.

16. The integrated circuit with enhanced security of claim 15, wherein the second data is generated in form of $f_{LOCK}$(A,R,K), A is the first data, R is the random code, K is an initial data, and $f_{LOCK}$( ) is the locking function.

17. The integrated circuit with enhanced security of claim 15, wherein the third data is generated in form of $f_{UNLOCK}$(A,R,C), A is the first data, R is the random code, C is the unlocking code, and $f_{UNLOCK}$( ) is the unlocking function.

18. The integrated circuit with enhanced security of claim 15, wherein the third data corresponds to the first data when the unlocking function is successfully performed.

* * * * *